March 31, 1953 W. W. SNYDER 2,633,526

ELECTRICAL CIRCUIT APPARATUS

Filed May 13, 1949 2 SHEETS—SHEET 1

INVENTOR.
Willis W. Snyder
BY [signature]
ATTORNEY

March 31, 1953 W. W. SNYDER 2,633,526

ELECTRICAL CIRCUIT APPARATUS

Filed May 13, 1949 2 SHEETS—SHEET 2

INVENTOR.
Willis W. Snyder
BY W. B. Richardson
ATTORNEY

Patented Mar. 31, 1953

2,633,526

UNITED STATES PATENT OFFICE 2,633,526

ELECTRICAL CIRCUIT APPARATUS

Willis W. Snyder, Roslyn Heights, N. Y., assignor to Sylvania Electric Products Inc., a corporation of Massachusetts Application May 13, 1949, Serial No. 93,104

8 Claims. (Cl. 250—16)

The present invention relates to electrical circuits such as those employing electron-discharge tubes in combination with usual circuit components such as resistors, condensers and so on. The present invention aims at providing novel structural features in the assembly of usual circuit components for improved compactness and mechanical stability.

The embodiment of the invention to be described is a single order of a decade counter, which employs multiple grid-controlled gaseous discharge tubes interconnected by a circuit including resistors and condensers. While compactness is an objective, the "printed-circuit" type of impedance components are not utilized in this embodiment, so that any component that is of improper value, or defective for any reason, may be replaced readily and without requiring an entire substitute circuit.

There are several features in this embodiment, separately useful but jointly contributing toward the purposes of the invention. One is the provision of an aperture in a generally flat supporting structure, or in a plate of insulating material that is a support for the circuit, with an impedance component lying flat in the aperture and having its terminals secured to metallic junction points on the plate. Another is the rigid and compact orientation of a miniaturized electron-discharge tube by connection of its electrode terminals to tie-points on opposite surfaces of the insulating support. Other features will become apparent. A thorough appreciation of the invention will make obvious its application to circuits entirely unrelated to the computer art. In the drawings:

Figure 4:
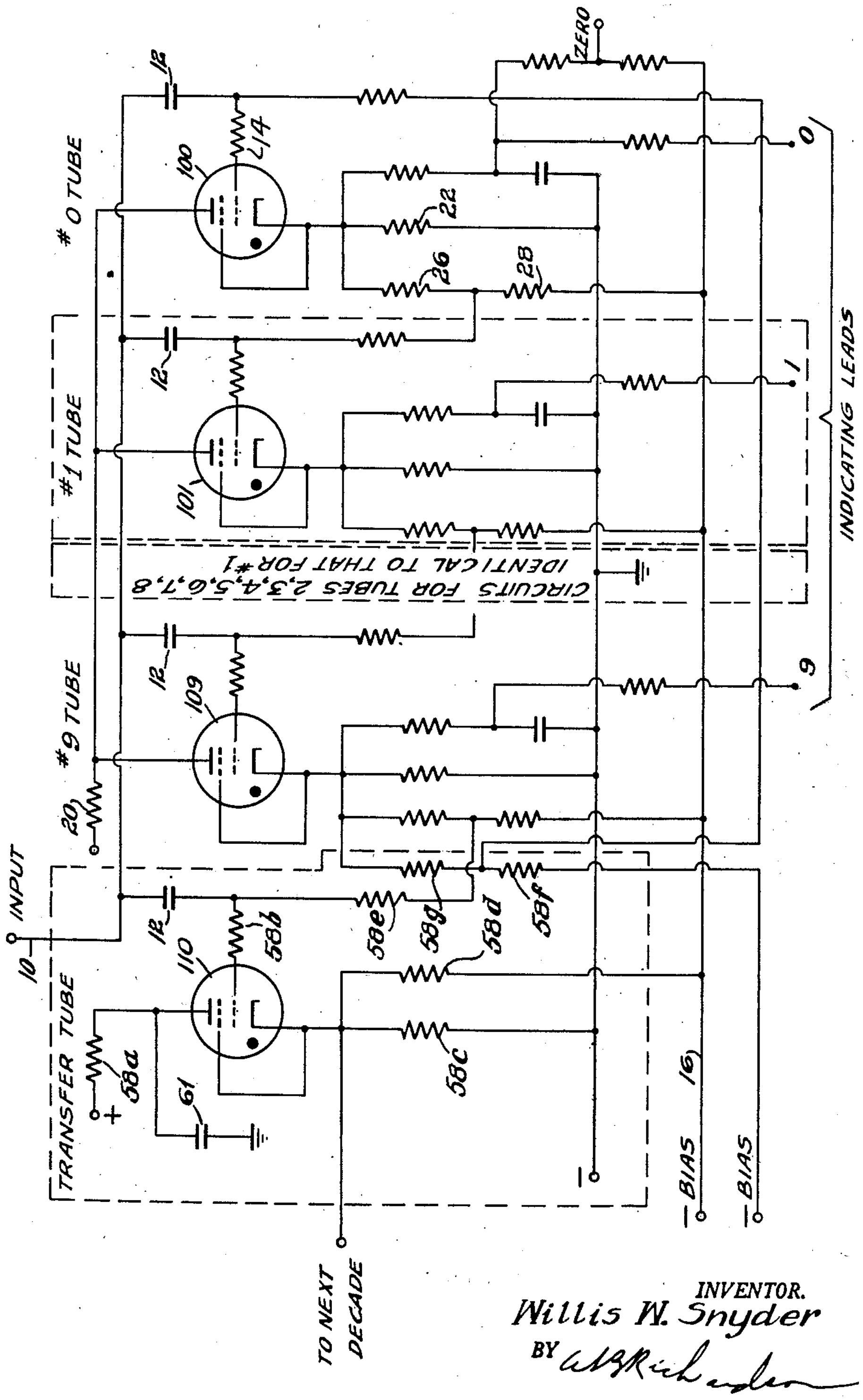
Fig. 4 is a wiring diagram of the decade counter.

In Fig. 4, the circuit arrangements of three of the counting tubes #0, #1 and #9 are shown together with that of a transfer tube. Each of the counting tubes 100, 101 . . . 109 is a grid-controlled gaseous electron-discharge tube, with the grids coupled to signal input line 10 through the several coupling condensers 12 and currentlimiting resistors 14. The grid resistor of each tube is connected to a bias line 16 via a resistor network in the cathode circuit of the preceding circuit. The grid circuit of the #0 tube 100 is similarly coupled to the cathode circuit of the #9 tube 109, ring-fashion. The anode circuits of all the tubes 100 . . . 109 in the ring are supplied with direct current from the positive terminal of a supply via resistor 20, while the negative terminal of the supply is grounded.

In operation, only one tube of the ring is conducting at any time, as a steady-state condition. If the #0 tube is conducting, bias resistor 22 in its cathode circuit raises the positive potential of voltage divider 26, 28, to make the bias on the #1 tube less negative than on tubes 102, 103, etc. In this condition it will fire if a positive pulse is impressed on line 10, but all other non-conducting tubes will be biased excessively for response to the pulse. The current drawn momentarily by the newly fired tube drops the common plate voltage of the tubes in the ring so that the previously fired tube is quenched. This operation is a sequential one, with one count per pulse.

The transfer tube 110 has its grid similarly coupled to line 10, and its bias circuit is connected to the cathode circuit of the #9 tube 109. When an impulse is impressed on resistor 58e at a time that the #9 tube is conducting (but not otherwise) this transfer tube will fire and emit a pulse from its cathode circuit to the input line of the next-higher order of the computer. Resistor 58a in the plate circuit is so large that the tube is extinguished immediately after the pulse.

Figure 1:
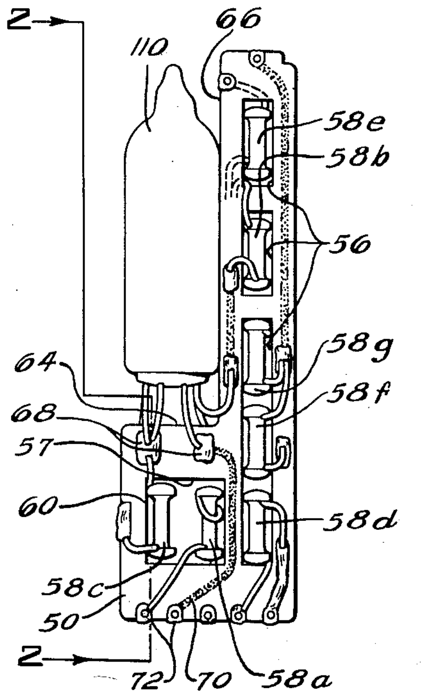
Fig. 1 is a lateral elevation of a computer subcircuit employing an electronic tube and the associated circuit components mounted on an insulating plate.
Figure 3:
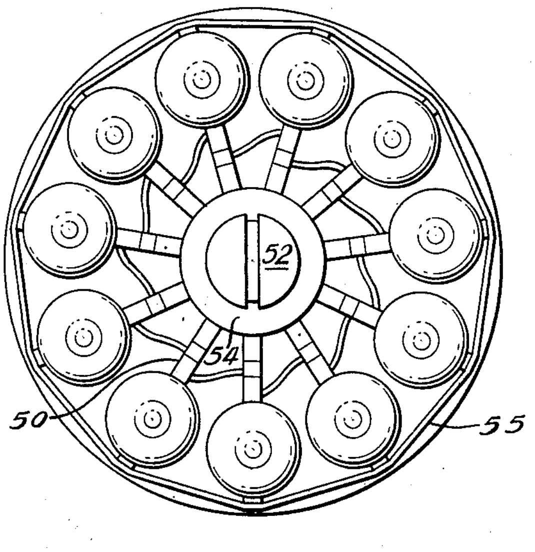
Fig. 3 is a plan view of an entire assembly of sub-circuits employed in an illustrative decade counter that is miniaturized as an embodiment of the present invention.
Figure 2:
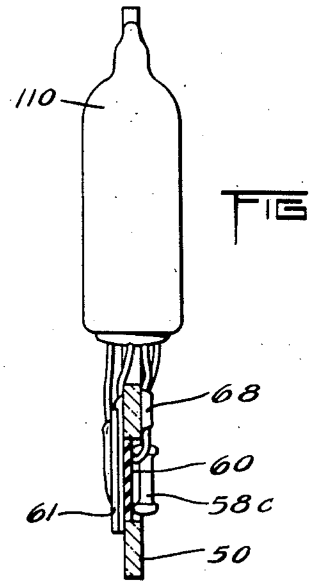
Fig. 2 is an end view, partly in section, of the device in Fig. 1.

The foregoing is in no way a part of my invention, and is purely to demonstrate the utility of the physically novel circuit apparatus illustrated in Figs. 1–3. Any one of the counting tubes is so far like the transfer tube that the latter is taken as typical of all of the tubes. As shown in Fig. 3, the tubes are arranged in a circle, the supporting plates 50 of insulating material being disposed radially and clamped together by screw 52 and washer 54, and with an encircling strap 55. The opposite end of the assembly is in the form of a plug-in connector having a sufficient number of prongs to provide for energization of the circuit and for the several indicating leads 0, 1, . . . 9.

In Figs. 1 and 2 a single plate 50 is shown, provided with elongated apertures 56 and a substantially square aperture 57 which receive resistors 58a . . . 58g lengthwise. These resistors are identified with the same numerals as in Fig. 4.

The resistors are sufficiently slender compared to the thickness of plate 50 so that they are almost wholly confined within their apertures except for their terminal leads. In the case of resistors 58a and 58c, a thin wafer 60 of insulating material is inserted which partly occupies the aperture. A condenser 61, formed by adhering a metal film to both faces of a ceramic wafer, is fixed by solder to a metal film adhered to plate 50, insulated from resistors 58a and 58c by wafer 60, and connected to the anode lead of the tube by solder. Resistors 58e, 58g and 58d are laterally centered to be confined largely between the surfaces of insulating plate 50. Resistor 58b is received partly in its aperture. A condenser 12 of wafer form (not shown in Fig. 1) is secured behind it in the manner of condenser 61 and connected as in Fig. 4.

Wafer 50 is made of a rough-surfaced ceramic material selected for good insulating properties, molded to the form shown. In addition to the apertures affording edges that surround the various resistors, an edge 64 is provided substantially at right angles to an edge portion 66, forming a recess that receives tube 110 to provide lateral support for the tube. Connections 68 on one surface of plate 50 are formed by adhering a metal film to the ceramic, and then soldering the leads of the tube and the resistors, as indicated. An adherent conductor 70 extends from one of the soldered tube connections 68. Terminals 72 are similarly provided in notches in plate 50, first by applying a conductive film and then by soldering. These terminals are for interconnecting the several sub-circuits. Other adherent conductors, at both sides of plate 50, are relied on to complete the electrical circuit in lieu of wire and to provide soldering tie-points which in turn support the components mechanically. Among the many known ways of providing an adherent metal film is to paint on silver oxide in a suitable vehicle and reduce the oxide to the metallic state by firing the unit, before soldering any circuit component in place.

The leads emerging from the end of glass-enclosed tube 110 are arranged in a circle. They may in the alternative be scattered over the area of the tube end. Plural leads are soldered to adherent metal films at each side of plate 50 adjacent edge 64. This alone provides a surprisingly stiff mechanical support for the tube in addition to completing the necessary circuit connections. The leads are desirably short, of the same order of magnitude as their maximum separation. Were the tube leads arranged along a straight line transverse of plate 50 they could be used but at lesser advantage, placing greater reliance on edge 66 of plate 50.

Resistors 58 are not only received in the apertures provided; their terminal leads are readily threaded to the right side of the insulating support, through the aperture. Thus, the leads of resistor 58e are both at the rear of the plate, while the leads of resistors 58b and 58g are soldered at opposite sides of plate 50.

Resistors are commonly formed in the long and slender shape shown, so that they can lie along the ceramic plate. Other components of like proportions can be similarly arranged in slots or apertures as may be required in other circuits, whether for radios, hearing aids or any other electrical apparatus. Chokes and crystal diodes can be supported in the manner shown for generally the same attributes.

A further latitude of rearrangement and substitution will occur to those skilled in the art, so that the appended claims should be accorded that broad interpretation that is consistent with the spirit and scope of the invention.

What is claimed is:

1. Electrical circuit apparatus including a plate of insulating material having opposite faces, circuit portions secured physically to said plate on both of said faces, and an elongated electron-discharge device having leads extending from an end thereof directly to opposite sides of said plate and secured to said circuit portions.

2. Electrical circuit apparatus including a generally flat insulating support having an edge portion and having conductors secured adjacent said edge portion to opposite surfaces of said support, and an elongated electron-discharge device having leads extending severally to opposite sides of said plate from an end of said device and secured to said conductors.

3. Electrical circuit apparatus comprising a supporting structure having generally flat parallel outside surfaces and conducting portions secured to said surfaces adjacent an edge thereof and on opposite sides thereof, and an elongated electron discharge device having leads extending from an end thereof and secured to said conducting portions, said end of said device being adjacent said edge and said leads including at least one lead extending directly to one side of said structure and at least one lead extending directly to the other side of said structure.

4. Electrical circuit apparatus including a generally flat support of insulating material, circuit terminals being secured to said support on opposite surfaces adjacent an edge thereof, and an elongated electron-discharge device having electrode leads emerging from an end thereof and secured to said circuit terminals and said end of said electron-discharge device being opposite said edge, said support having an additional edge portion extending from said edge laterally of said electron-discharge device, the electron-discharge device thus lying generally in the plane of the support and in a recess thereof.

5. Electrical circuit apparatus including an insulating plate, adhered conductive areas on opposite surfaces of said plate near an edge thereof, an elongated electron-discharge device having leads emerging from points distributed over the end surface thereof and being soldered to said conductive areas with certain leads extending directly to one of said surfaces and other leads extending to the opposite one of said surfaces.

6. Electrical circuit apparatus including an insulating plate having a pair of edges abutting each other at substantially right angles to afford a recess and conductive areas adhered to opposite surfaces thereof adjacent one of said edges, and an elongated electron-discharge device having leads emerging from one end and extending directly toward said one of said edges and soldered to said conductive areas severally on said opposite surfaces, said device extending along the other of the abutting edges thereby to be supported in said recess.

7. Electrical circuit apparatus including an elongated electron-discharge device having leads emerging from an end thereof, a generally flat insulating support having conducting areas adhered to opposite surfaces thereof, at least one slot being formed in said support, and an elongated impedance component received in said slot and having terminal leads, the leads of said component and electron-discharge device being soldered variously to said conducting areas with at least one such area being common to said device and said component and furnishing both mechanical connection to the support and electrical connection to each other.

8. Electrical circuit apparatus including a rough-surfaced ceramic supporting plate having an aperture and an edge portion, conductors adhered to opposite surfaces of said ceramic plate adjacent said edge portion, an elongated electron-discharge device extending along said plate and having leads projecting from one end and soldered to certain of said conductors including conductors on both of said opposite surfaces, and a resistor received in said aperture and having terminal leads one of which is soldered to one of the conductors and another of which is soldered to another of said conductors.

WILLIS W. SNYDER.

REFERENCES CITED

The following references are of record in the file of this patent:

UNITED STATES PATENTS

| Number | Name | Date |
|---|---|---|
| Re. 20,224 | Van Billiard | Dec. 29, 1936 |
| 1,719,456 | Sterba | July 2, 1929 |
| 2,431,198 | Posen | Nov. 18, 1947 |
| 2,439,408 | Mitchell | Apr. 13, 1948 |
| 2,440,308 | Storck | Apr. 27, 1948 |
| 2,474,988 | Sargrove | July 5, 1949 |

FOREIGN PATENTS

| Number | Country | Date |
|---|---|---|
| 144,122 | Switzerland | Mar. 2, 1931 |